US012748647B2

(12) United States Patent

Iyanu et al.

(10) Patent No.: US 12,748,647 B2

(45) Date of Patent: Sep. 29, 2026

(54) SYSTEM AND METHOD FOR USE WITH A DISTRIBUTED EVENT STREAMING ENVIRONMENT FOR MAKING SERVICES RESILIENT OF PRODUCER FAILURES

(71) Applicant: ORACLE INTERNATIONAL CORPORATION, Redwood Shores, CA (US)

(72) Inventors: Rajasekaran Iyanu, Bengaluru (IN); Kirk Bittler, Newport, OR (US); Shengsong Ni, Issaquah, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/815,661

(22) Filed: Aug. 26, 2024

(65) Prior Publication Data

US 2026/0056817 A1 Feb. 26, 2026

(51) Int. Cl.
*G06F 11/00* (2006.01)
*G06F 11/07* (2006.01)

(52) U.S. Cl.
CPC ................................ *G06F 11/0757* (2013.01)

(58) Field of Classification Search
CPC .. G06F 11/0757; G06F 11/075; H04L 1/1835; H04L 1/188; H04L 1/189
See application file for complete search history.

(56) References Cited

U.S. PATENT DOCUMENTS 12,418,552 B1 * 9/2025 Karaje .................. H04L 43/045
2009/0059916 A1 * 3/2009 DeCusatis ............... H04L 1/188 370/389
2017/0063496 A1 * 3/2017 Shiraishi ................... H04L 1/08
2022/0342665 A1 * 10/2022 Shimoyama ............ G06F 7/588
2023/0023744 A1 * 1/2023 Verma ................. G06F 11/3006

* cited by examiner

*Primary Examiner* — Philip Guyton
*Assistant Examiner* — Sean Kevin McNamara
(74) *Attorney, Agent, or Firm* — TUCKER ELLIS LLP

(57) ABSTRACT

In accordance with an embodiment, described herein are a system and method for use with a distributed event streaming environment (e.g., a Kafka environment), for making services resilient of producer failures. When a determination is made that one or more messages could not be sent to a particular topic after a timeout error, those messages are stored in a centralized cache (e.g., as provided by a database service). A key-partitioner algorithm or process is used to pre-compute a partition ID into which the message will be re-sent. The pre-computed partition ID is used to compute the key of the cache entry for the message as stored within the centralized cache. A recurrent watchdog per group of microservice resources (e.g., per pod) operates to query the centralized cache for the messages to be re-sent into the partitions pertaining to those resources (i.e., that pod).

20 Claims, 12 Drawing Sheets

SYSTEM AND METHOD FOR USE WITH A DISTRIBUTED EVENT STREAMING ENVIRONMENT FOR MAKING SERVICES RESILIENT OF PRODUCER FAILURES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to distributed event streaming environments, and are particularly directed to systems and methods for use with a distributed event streaming environment for making services resilient of producer failures.

BACKGROUND

Distributed event streaming environments provide a computing environment for building real-time data pipelines and streaming applications which are well-suited to handling large volumes of data in a scalable and fault-tolerant manner.

For example, in an Apache Kafka environment, a producer operates to receive an input data as messages and communicate with one or more brokers to write the data into partitioned topics, from which other entities can then consume the data.

In such an environment, the producer can be associated with a delivery timeout property that defines the time to report a success or failure after a call to produce a message to a master broker. However, during an upgrade, migration, or disaster recovery of a distributed cluster, broker pods may be upgraded to later versions, and a message produced to the distributed event streaming environment may be rejected after exceeding the delivery timeout value.

SUMMARY

In accordance with an embodiment, described herein are a system and method for use with a distributed event streaming environment (e.g., a Kafka environment), for making services resilient of producer failures.

When a determination is made that one or more messages could not be sent to a particular topic after a timeout error, those messages are stored in a centralized cache (e.g., as provided by a database service).

A key-partitioner algorithm or process is used to precompute a partition ID into which the message will be re-sent. The pre-computed partition ID is used to compute the key of the cache entry for the message as stored within the centralized cache.

A recurrent watchdog per group of microservice resources (e.g., per pod) operates to query the centralized cache for the messages to be re-sent into the partitions pertaining to those resources (i.e., that pod).

Upon a successful resend of the messages to a producer, those messages are removed from the centralized cache. Any remaining messages that could still not be sent to the producer are stored in the centralized cache for use in attempting to retry the operation during a subsequent execution of the watchdog.

DETAILED DESCRIPTION

Distributed event streaming environments provide a computing environment for building real-time data pipelines and streaming applications which are well-suited to handling large volumes of data in a scalable and fault-tolerant manner.

For example, in an Apache Kafka environment, a producer operates to receive an input data as messages and communicate with one or more brokers to write the data into partitioned topics, from which other entities can then consume the data.

In such an environment, the producer can be associated with a delivery timeout property that defines the time to report a success or failure after a call to produce a message to a master broker. However, during an upgrade, migration, or disaster recovery of a distributed cluster, broker pods may be upgraded to later versions, and a message produced to the distributed event streaming environment may be rejected after exceeding the delivery timeout value.

Increasing this timeout value to a much larger value is generally not recommended. As such, when used with a computing environment that includes microservices there is need for microservices that leverage Kafka for messaging pipeline to design a methodology to avoid messages being rejected by the microservices'REST API layer due to the message being rejected by the Kafka brokers.

Cloud Environments

Figure 1:
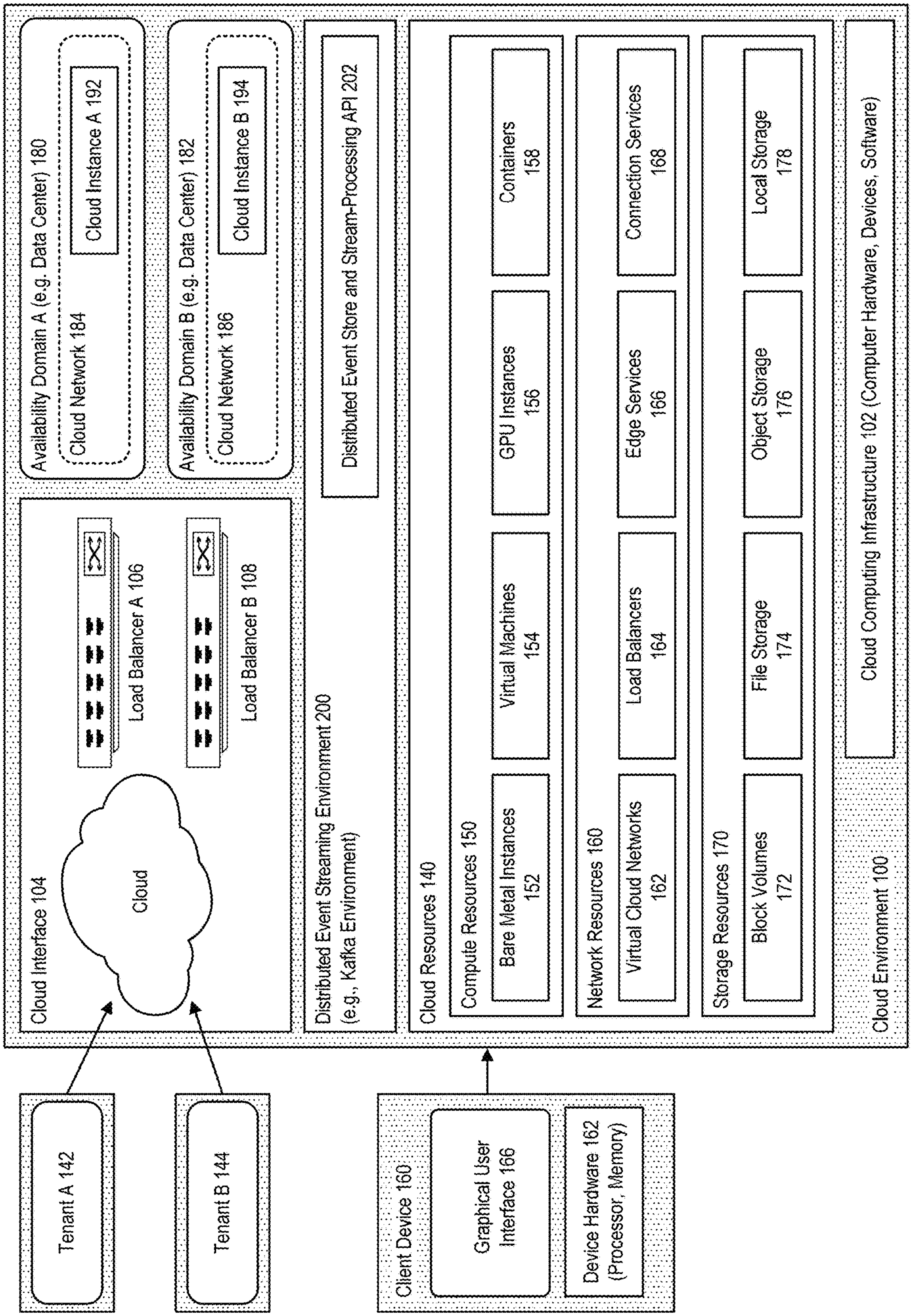
FIG. 1 illustrates an example cloud environment, in accordance with an embodiment.

FIG. 1 illustrates an example cloud environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment within which a container orchestration system can be used to support application workloads. In accordance with other embodiments, the various components, processes, and features described herein can be used with other types of container orchestration systems, or other types of computing environments.

As illustrated in FIG. 1, in accordance with an embodiment, a cloud computing environment (cloud environment) 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108.

In accordance with an embodiment, the cloud environment supports the use of availability domains, such as for example availability domains A 180, B 182, which enables customers to create and access cloud networks 184, 186, and run cloud instances A 192, B 194.

In accordance with an embodiment, a tenancy can be created for each cloud customer or tenant, for example tenant A 142, B 144, which provides a secure and isolated partition within the cloud environment within which the customer can create, organize, and administer their cloud resources. A cloud customer or tenant can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator or other user to communicate with the cloud computing environment via a network such as, for example, a wide area network, local area network, or the Internet, to create or update cloud services.

In accordance with an embodiment, the cloud environment provides access to shared cloud resources 140 via, for example, a compute resources layer 150, a network resources layer 160, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud environment can be used to provide control of physical host ("bare metal") machines within the compute resources layer, which run as compute cloud instances directly on bare metal servers, without a hypervisor.

In accordance with an embodiment, the cloud environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 162, load balancers 164, edge services 166, and/or connection services 168.

In accordance with an embodiment, the storage resources layer can comprise a number of resources, such as, for example, data/block volumes 172, file storage 174, object storage 176, and/or local storage 178.

In accordance with an embodiment, the cloud environment can include a container orchestration system, and container orchestration system API, that enables containerized application workflows to be deployed to a container orchestration environment, for example a Kubernetes cluster. In such an environment, a microservice can be deployed to a pod, which operates as a group of one or more containers that run on a node within the cluster.

For example, in accordance with an embodiment, the cloud environment can be used to provide containerized compute cloud instances within the compute resources layer, and a container orchestration implementation (e.g., OKE), can be used to build and launch containerized applications or cloud-native applications, specify compute resources that the containerized application requires, and provision the required compute resources.

As described above, in a distributed computing environment having a cluster of nodes that supports one or more colocated partitions distributed across the nodes, when the cluster becomes overloaded, it must generally be expanded by adding more nodes, to avoid a potential system crash.

However, in some distributed computing environments, for example Apache Kafka environments, user intervention is typically required to bring up an additional node or broker, and then, when the new node has been added to the cluster, manually reassign some of the existing colocated partitions distributed across the nodes, to the newly-added node.

Figure 2:
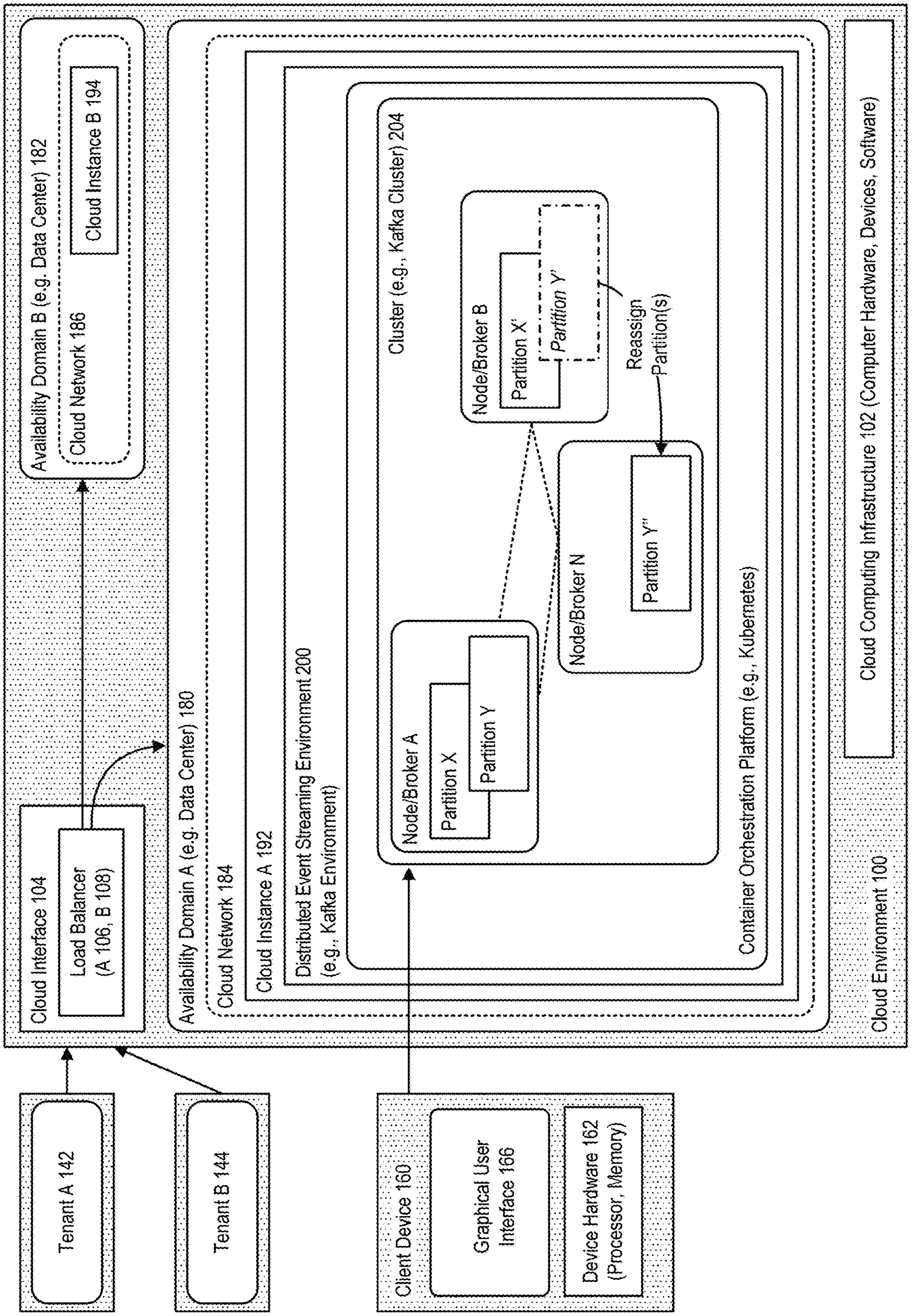
FIG. 2 further illustrates an example cloud environment that includes a distributed event streaming environment, in accordance with an embodiment.

FIG. 2 further illustrates an example cloud environment that includes a distributed event streaming environment, in accordance with an embodiment.

As illustrated in FIG. 2, in accordance with an embodiment, a cloud computing environment can include or operate in association with a container orchestration platform component, such as, for example, a Kubernetes or other type of container orchestration environment, that enables deployment, scaling, and management of containerized applications.

For example, in accordance with an embodiment, the cloud computing environment provides distributed streaming or messaging via a distributed event streaming environment 200, such as for example an Apache Kafka environment, that maintains feeds of messages in topics which are partitioned and replicated across multiple nodes/brokers of a cluster 204 (e.g., a Kafka cluster).

For example, in accordance with an embodiment, the cluster can include a first node/broker A, and a second node/broker B, each of which includes one or more colocated partitions A, B, distributed within the cluster.

Service Resiliency

As described above, in a distributed event streaming environment, such as an Apache Kafka environment, a producer operates to receive an input data as messages and communicate with one or more brokers to write the data into partitioned topics, from which other entities can then consume the data.

During an upgrade, migration, or disaster recovery of a distributed event streaming cluster, broker pods may be upgraded to later versions, and a message produced to the environment may be rejected after exceeding a delivery timeout value. During such downtime, the system should operate to avoid message loss, for example when publishing messages to Kafka.

Figure 3:
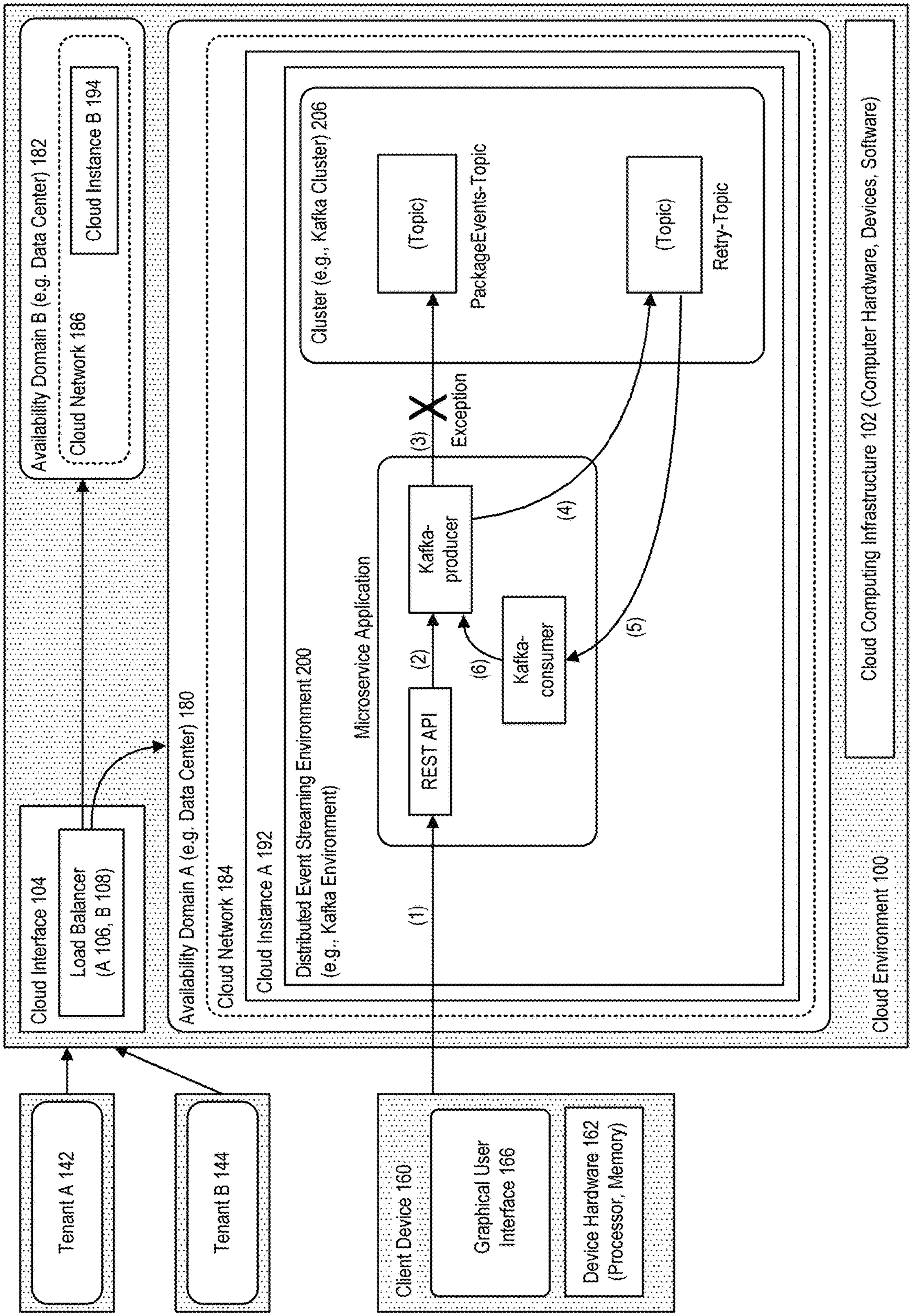
FIG. 3 illustrates an approach for use with a distributed event streaming environment, in accordance with an embodiment.

FIG. 3 illustrates an approach for use with a distributed event streaming environment, in accordance with an embodiment.

As illustrated in FIG. 3, one approach to avoiding message loss in a distributed event streaming cluster 206 (e.g., a Kafka cluster) is to send those messages received from a client (1) and that are directed to a producer (2), but that could not be sent to a particular Kafka topic (3), instead to a retry topic that will be then consumed by a retry consumer (3, 4, 5).

However, when a cluster of Kafka brokers are upgraded or a rebalance happens, the message may not always be ingested into this retry topic by the Kafka master broker.

Another approach to address the issue of potential message loss is to persist those messages that could not be sent to Kafka to a centralized data store, and to attempt resending the messages after some period of time.

However, a problem with this approach is ensuring that only one pod among several of a component's microservices attempts to resend the message to Kafka again. The polling threads that look for the message to resend will be running in each of those pods, which requires a coordination mechanism among the polling threads across the several pods to look only for those messages that are specific to the partitions being managed by that specific pod.

An additional disadvantage of the above approaches is their general inability to accommodate downtimes longer than several minutes, after which timeframe the system can exhibit additional issues such as latency or other factors. For example in the approach illustrated in FIG. 3, the use of a retry topic will not be successful if the cluster is not available.

Services Resilient of Producer Failures

In accordance with an embodiment, described herein are a system and method for use with a distributed event streaming environment (e.g., a Kafka environment), for making services resilient of producer failures.

When a determination is made that one or more messages could not be sent to a particular topic after a timeout error, those messages are stored in a centralized cache (e.g., as provided by a database service).

A key-partitioner algorithm or process is used to pre-compute a partition ID into which the message will be re-sent. The pre-computed partition ID is used to compute the key of the cache entry for the message as stored within the centralized cache.

A recurrent watchdog per group of microservice resources (e.g., per pod) operates to query the centralized cache for the messages to be re-sent into the partitions pertaining to those resources (i.e., that pod).

Upon a successful resend of the messages to a producer, those messages are removed from the centralized cache. Any remaining messages that could still not be sent to the producer are stored in the centralized cache for use in attempting to retry the operation during a subsequent execution of the watchdog.

FIGS. 4-7 illustrate a system for use with a distributed event streaming environment for making services resilient of producer failures, in accordance with an embodiment In accordance with an embodiment, the components and processes illustrated in FIGS. 4-7, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

Additionally, although the figures provided herein generally illustrate examples or use with a Kafka environment; in accordance with various embodiments, the systems and methods described herein can be used with other types of distributed event streaming environments or other computing environments.

Figure 4:
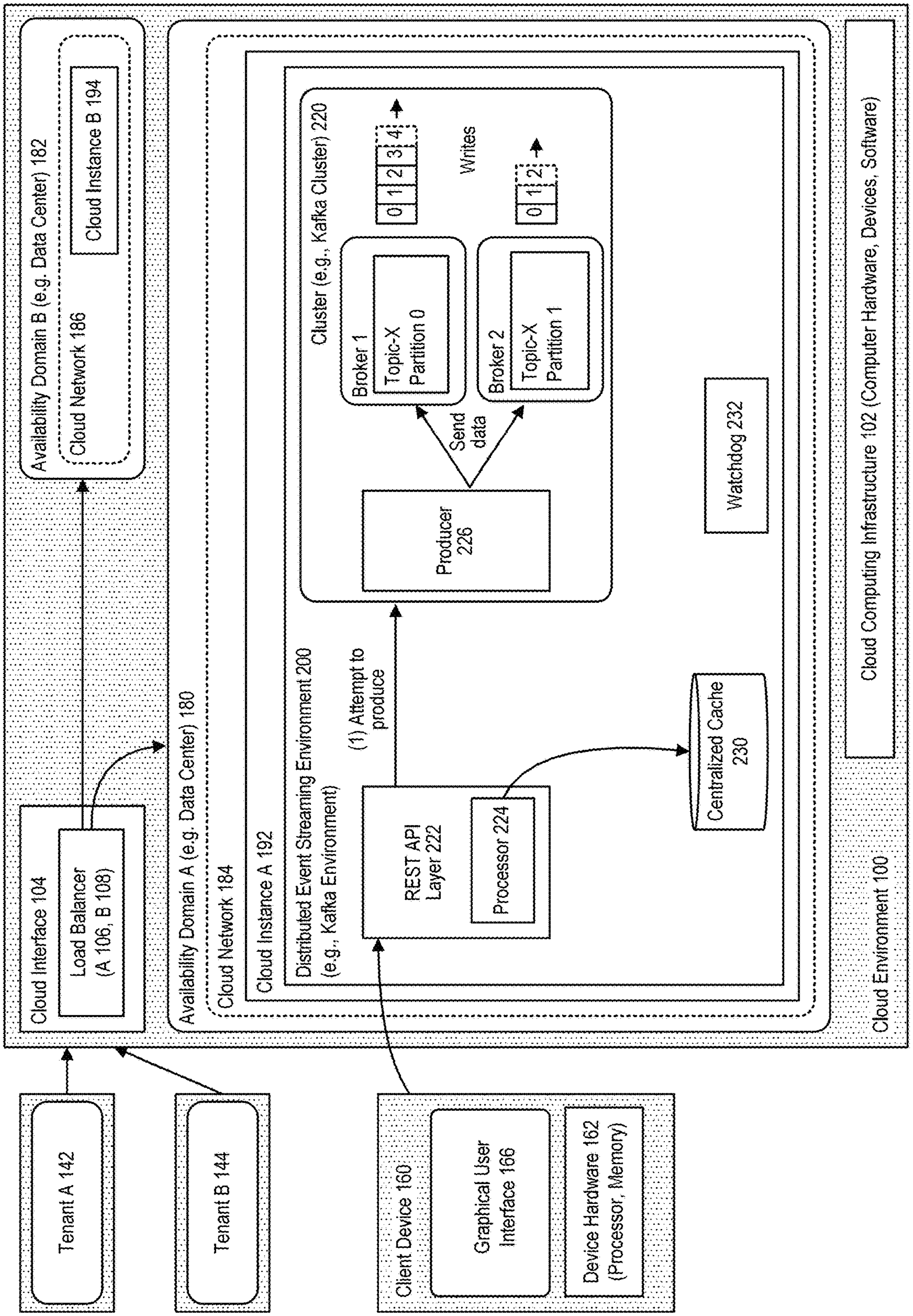
FIG. 4 illustrates a system for use with a distributed event streaming environment for making services resilient of producer failures, in accordance with an embodiment.

As illustrated in FIG. 4, in accordance with an embodiment, within a distributed event streaming environment that includes a cluster 220 of nodes and one or more partitions distributed across the nodes, a producer 226 operates to receive an input data as messages and communicate with one or more brokers to write the data into partitioned topics, from which other entities can then consume the data.

In response to a request from a client received, for example, at a microservice REST API layer 222, the processor 224 will attempt to produce a message to the producer, for writing or sending the data to an appropriate topic.

As illustrated in FIG. 4, and described in further detail below, in accordance with an embodiment the REST API layer and processor can also communicate with a centralized cache 230 or service (e.g., as provided by a database service, for example as a Redis cache) for purposes of storing or persisting messages. The system can also include one or more recurrent watchdog 232 per group of microservice resources (e.g., per pod), that operate to query the centralized cache for the messages to be re-sent into the partitions pertaining to those resources (i.e., that pod).

Figure 5:
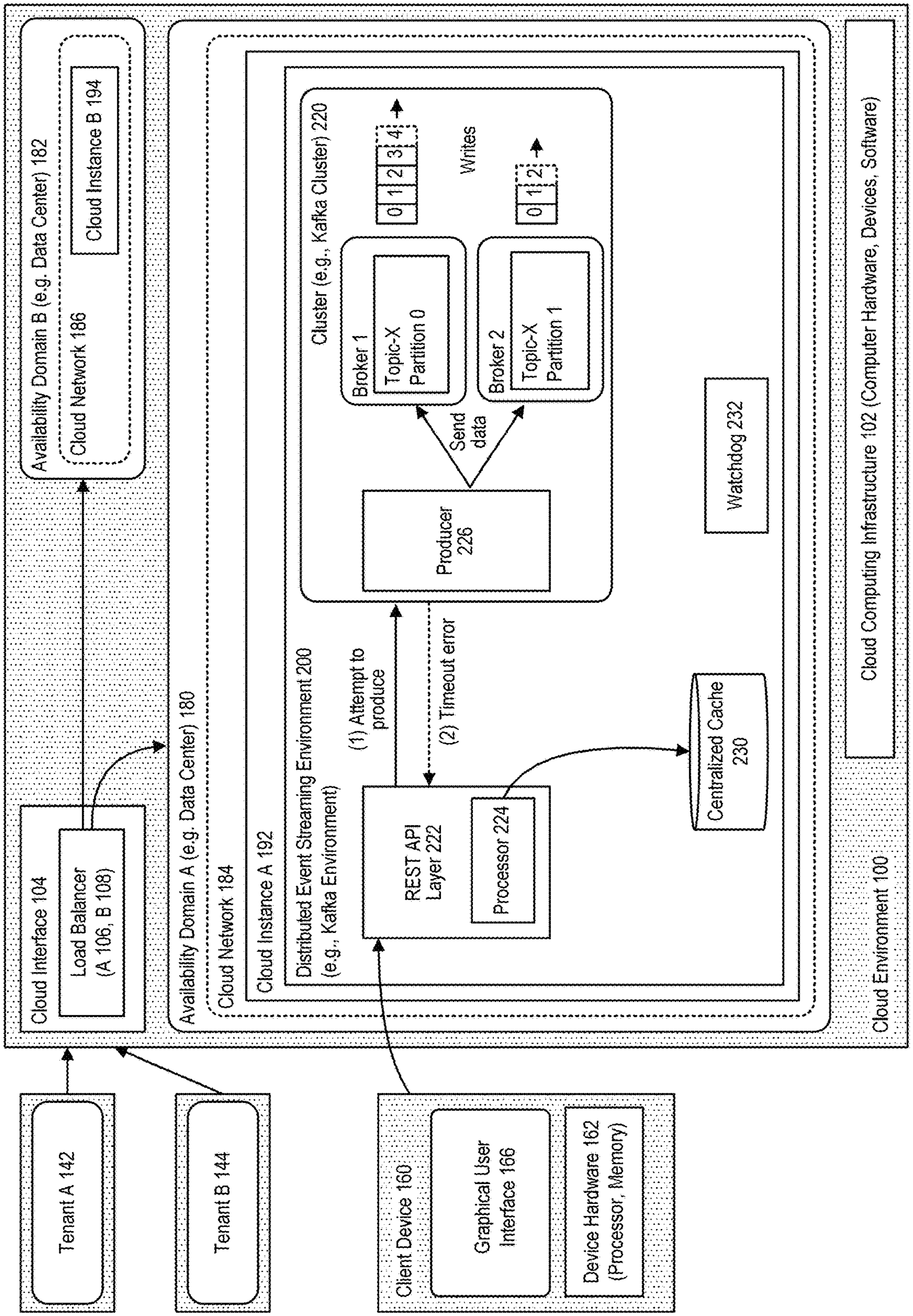
FIG. 5 further illustrates how the system can be used to make services resilient of producer failures, in accordance with an embodiment.

As illustrated in FIG. 5, in accordance with an embodiment, if the producer is not available, for example during a downtime as described above, then the REST API later will receive a timeout error when it attempts to produce a message to that producer.

Figure 6:
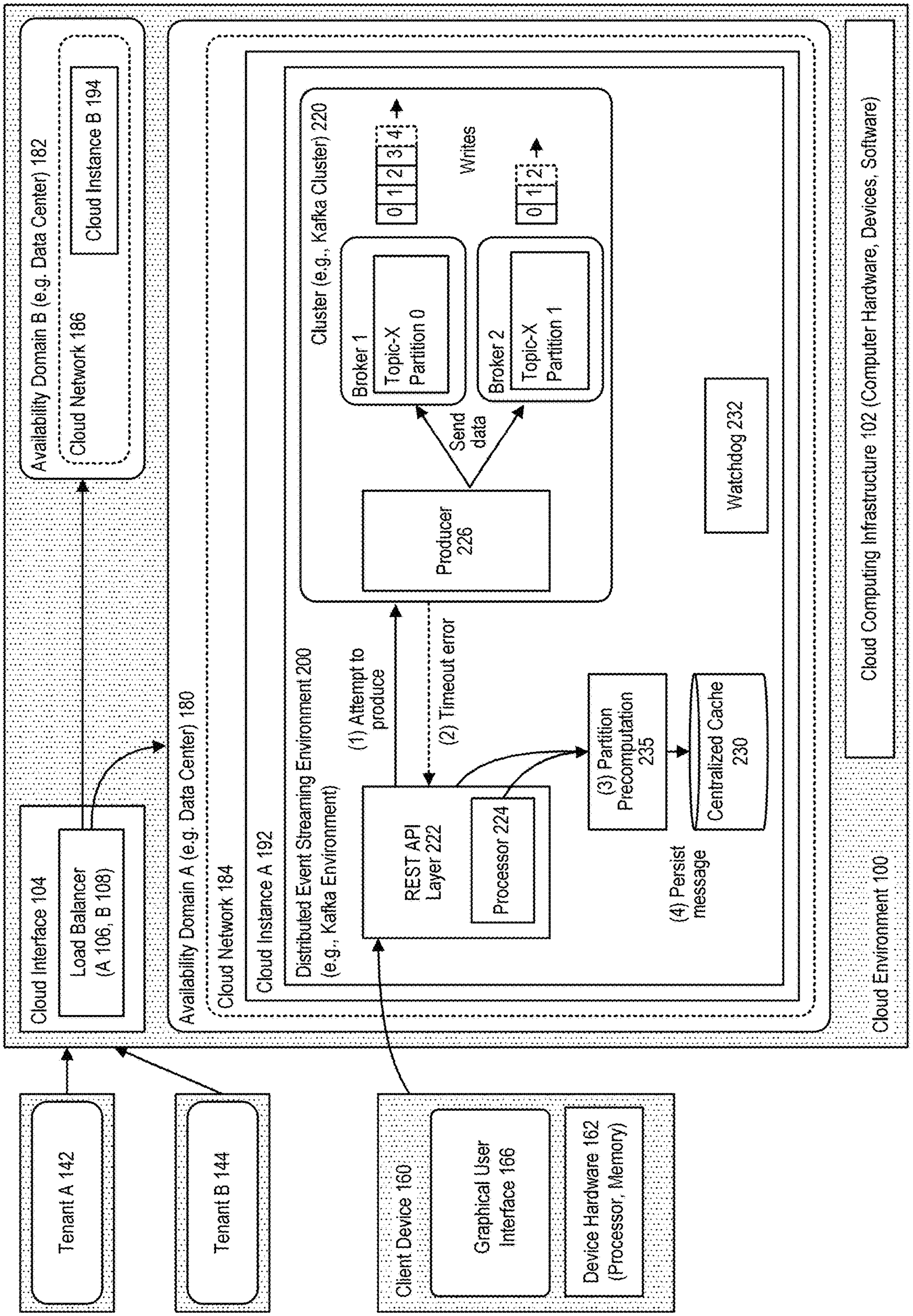
FIG. 6 further illustrates how the system can be used to make services resilient of producer failures, in accordance with an embodiment.

As illustrated in FIG. 6, in accordance with an embodiment, when a determination is made that one or more messages could not be sent to a particular topic after a timeout error, those messages are stored in a centralized cache (e.g., as provided by a database service, for example a Redis cache).

In accordance with an embodiment, the REST API layer performs a key-partitioner algorithm or process that is used to pre-compute a partition ID (e.g., a partitionId) into which the (e.g., Kafka) message will be re-sent. The pre-computed partition ID is used to compute the key of the cache entry for the message as stored within the centralized cache.

In accordance with an embodiment, since the REST API layer already know which partition a particular message should be sent to, the system can leverage or use (in this example) the Kafka partitioner to determine the pre-computed partition ID (key) that will be stored in the centralized cache, which effectively segregated the data in a manner similar to how the data might be segregated in a traditional database.

Figure 7:
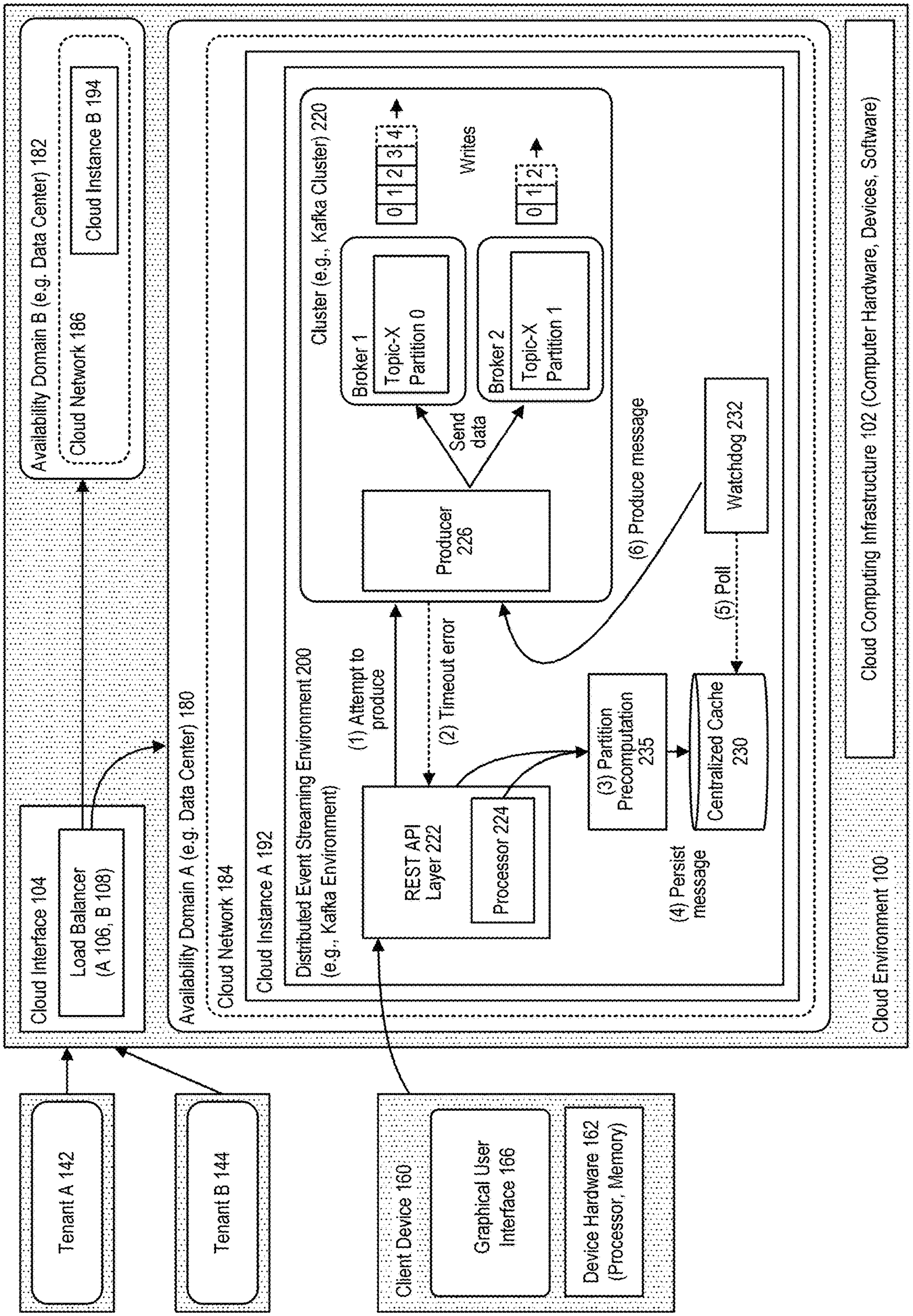
FIG. 7 further illustrates how the system can be used to make services resilient of producer failures, in accordance with an embodiment.

As illustrated in FIG. 7, in accordance with an embodiment, a recurrent watchdog associated with a group of microservice resources (e.g., per pod) operates to query the centralized cache for the messages to be re-sent into the partitions pertaining to those resources (i.e., that pod).

Each watchdog can be configured to operate on a periodic basis, for example at 5-minute intervals or windows, to determine which messages that particular watchdog should attempt to resend to the producer. The watchdog process looks in the centralized cache for messages stored thereon that are destined for its partitions.

Upon a successful resend of the messages to a Kafka producer, those messages are removed from the centralized cache. Any remaining messages that could still not be sent to the Kafka producer continue to be stored in the centralized cache for use in attempting to retry the operation during a subsequent execution of the watchdog (e.g., at the next 5 minute window).

As illustrated above, the described approach leverages functionality provided by the distributed event streaming environment—for example the key-partitioner algorithm or process can leverage the Kafka partitioner algorithm or process and its partition-topic assignment process, to use those assignments to determine in the centralized cache which particular keys to use, for use in later determine which message(s) to retry.

For example, in a Kafka environment, each scheduler pod will have one or more consumers, with each consumer in the same consumer group across all the pods. The Kafka environment assigns partitions for topics to consumers. When Kafka does this, it sends a notification. In accordance with an embodiment, the system can aggregate those partitions within the pod that are assigned, and keep that information in memory. This data can then be used to determine which keys to look up in the centralized cache.

Since a distributed streaming environment may support a large number of microservice, partition, and topics, segregating the data in this manner can be used to reduce contention in that each watchdog only needs to access data within the centralized cache appropriate to the particular partitions associated with that watchdog.

In accordance with an embodiment, the system can use the Kafka default partitioner algorithm or process to get to know the most possible partitionId into which the Kafka message might get ingested into. The default partitioner logic to compute partition for the given message key can be illustrated as:

```
Utils.toPositive(Utils.murmur2(messageKey.getBytes
    (StandardCharsets.UTF_8))) % Numpartitionsoftopic;
```

In accordance with an embodiment, this precomputed partitionId will be used as the suffix of the cache entry key, whereas the prefix will be the name of the Kafka topic into which the message will be re-sent again. The Value part of the cache entry will be the list of serialized string of the messages. An example format of the cache entry in <Key: Value> format:

<topicname #partitionid>:<list<string>>

FIGS. 8-11 further illustrate how the system can be used to make services resilient of producer failures, in accordance with an embodiment.

Figure 8:
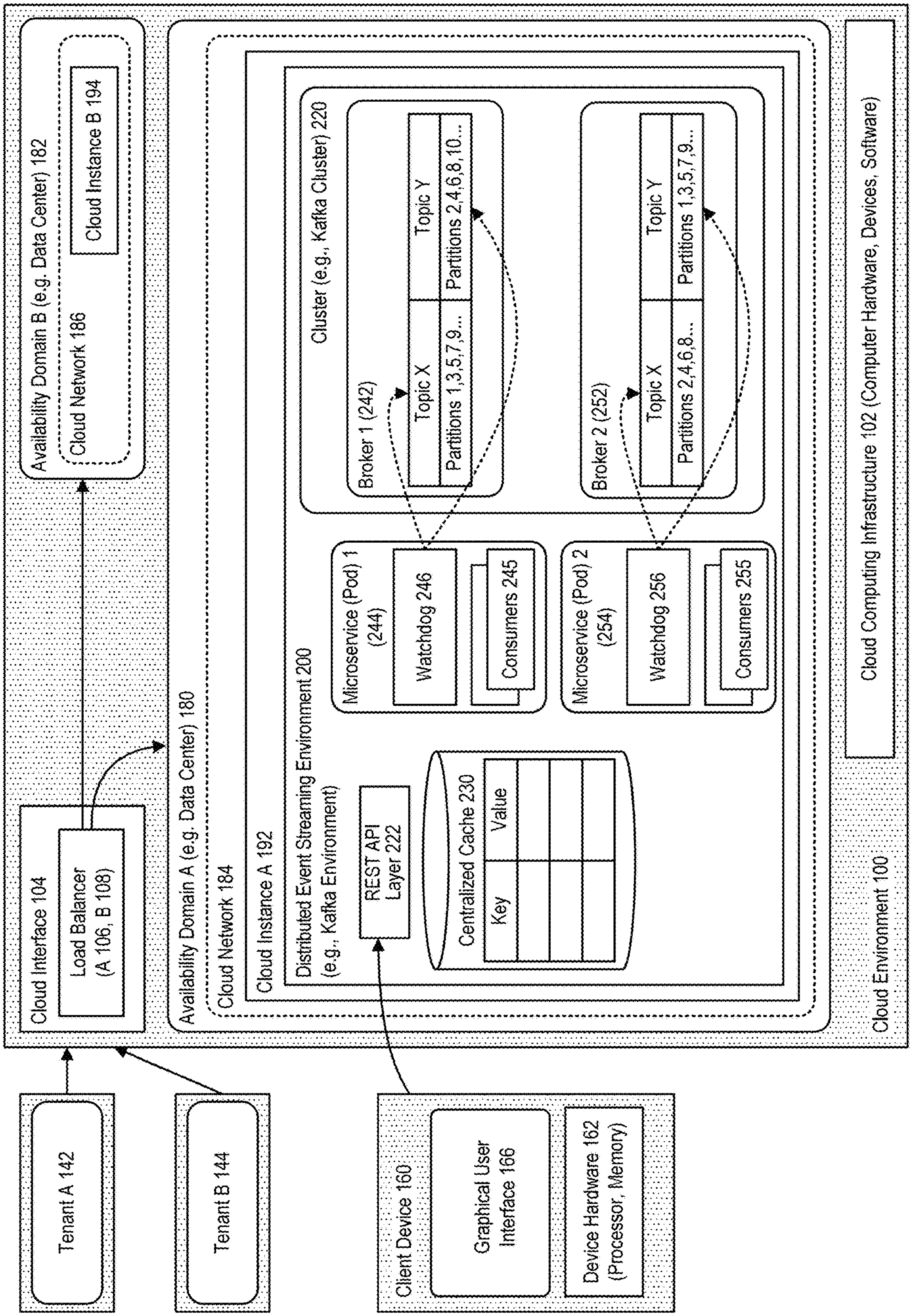
FIG. 8 further illustrates how the system can be used to make services resilient of producer failures, in accordance with an embodiment.

As illustrated in FIG. 8, in accordance with an embodiment, a distributed event streaming environment includes a cluster and one or more brokers (242, 252) and partitions accessed by a plurality of microservices (pods) (244, 254)—each if which includes consumers (245, 255) and a watchdog (246, 256) per pod, as described above.

Figure 9:
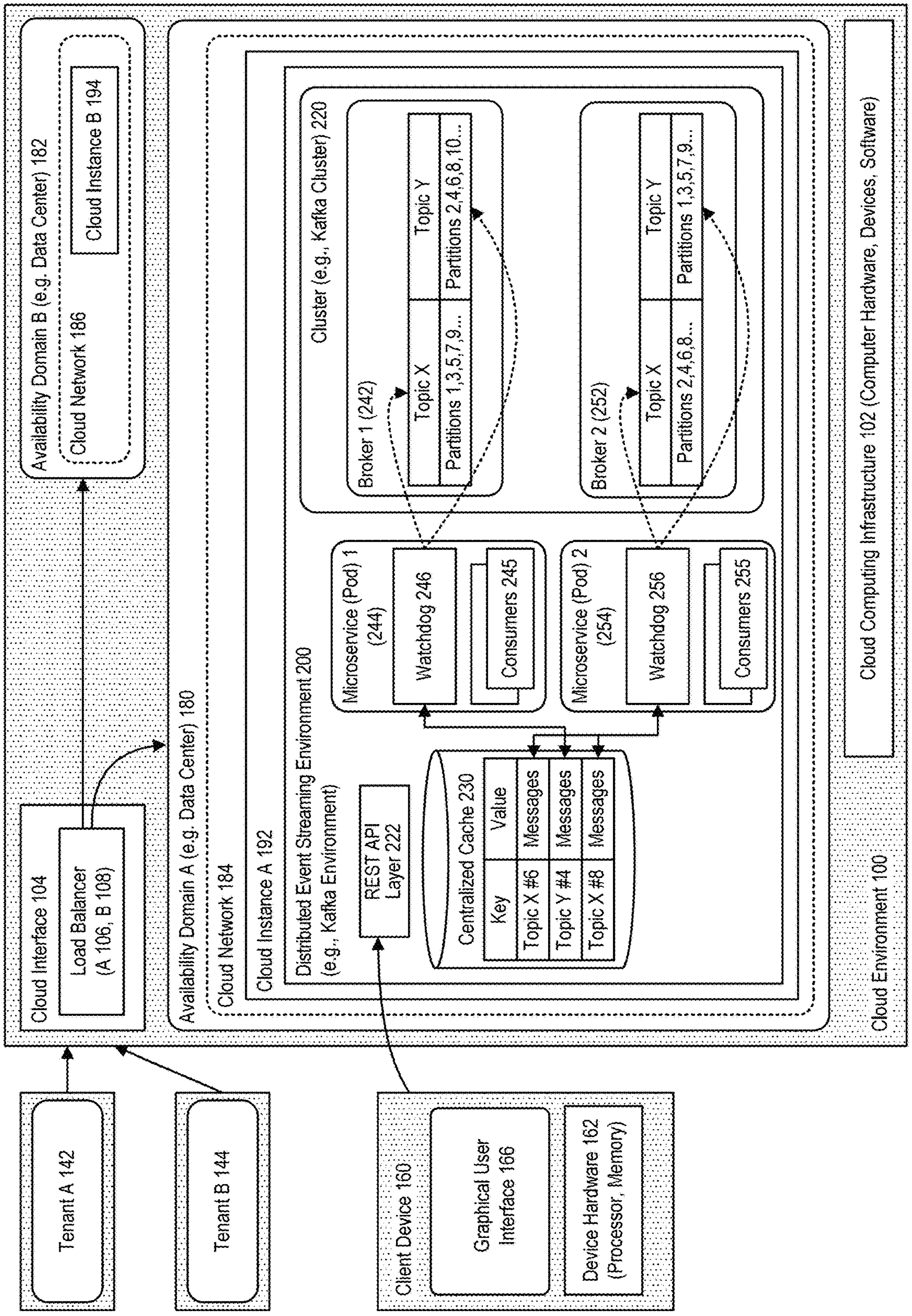
FIG. 9 further illustrates how the system can be used to make services resilient of producer failures, in accordance with an embodiment.

As illustrated in FIG. 9, in accordance with an embodiment, when a determination is made that one or more messages could not be sent to a particular topic after a timeout error, those messages are stored in a centralized cache (e.g., as provided by a database service, for example a Redis cache).

In accordance with an embodiment, the REST API layer performs a key-partitioner algorithm or process that is used to pre-compute a partition ID (e.g., a partitionId) into which the (e.g., Kafka) message will be re-sent. The pre-computed partition ID is used to compute the key of the cache entry for the message as stored within the centralized cache.

Figure 10:
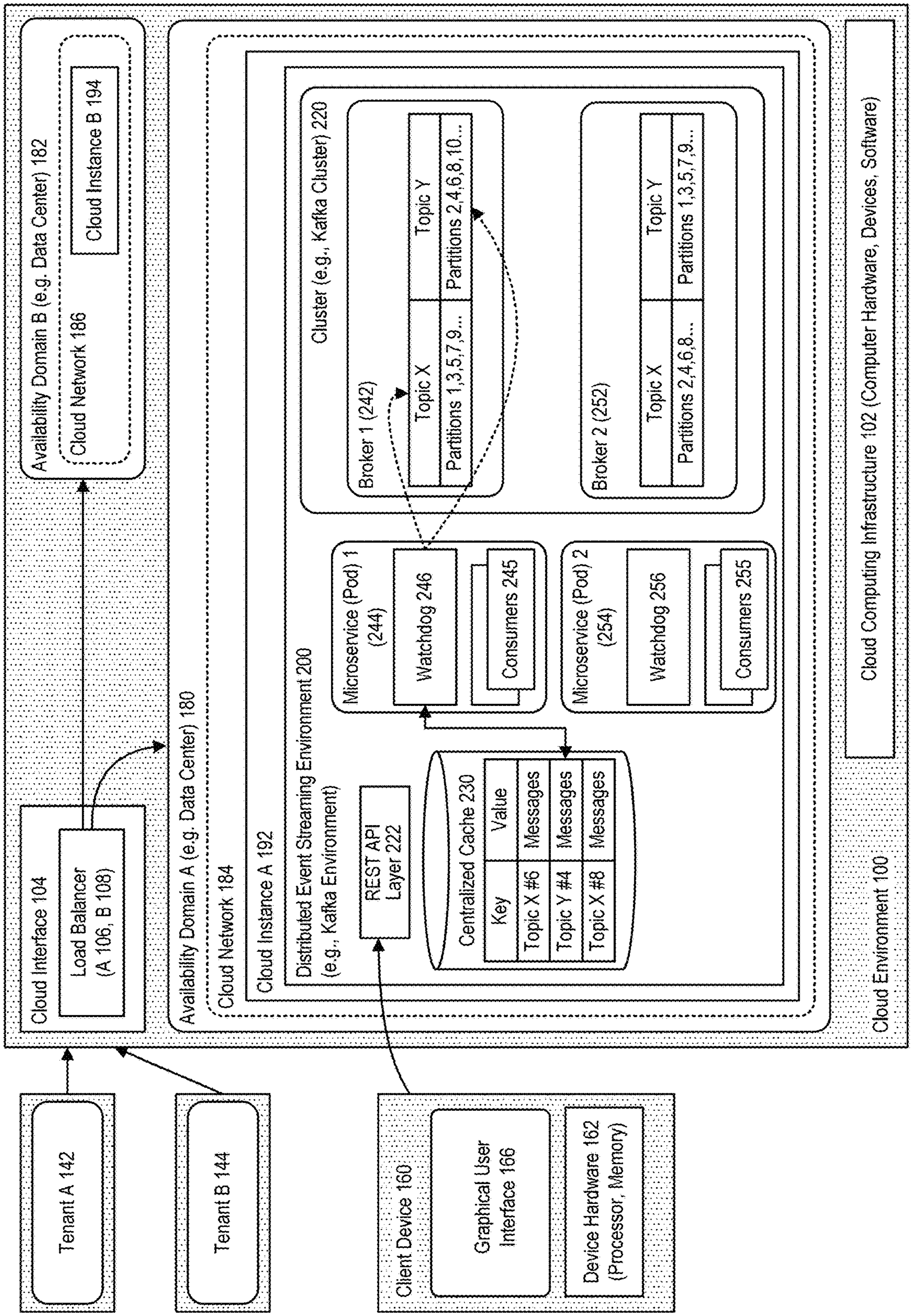
FIG. 10 further illustrates how the system can be used to make services resilient of producer failures, in accordance with an embodiment.
Figure 11:
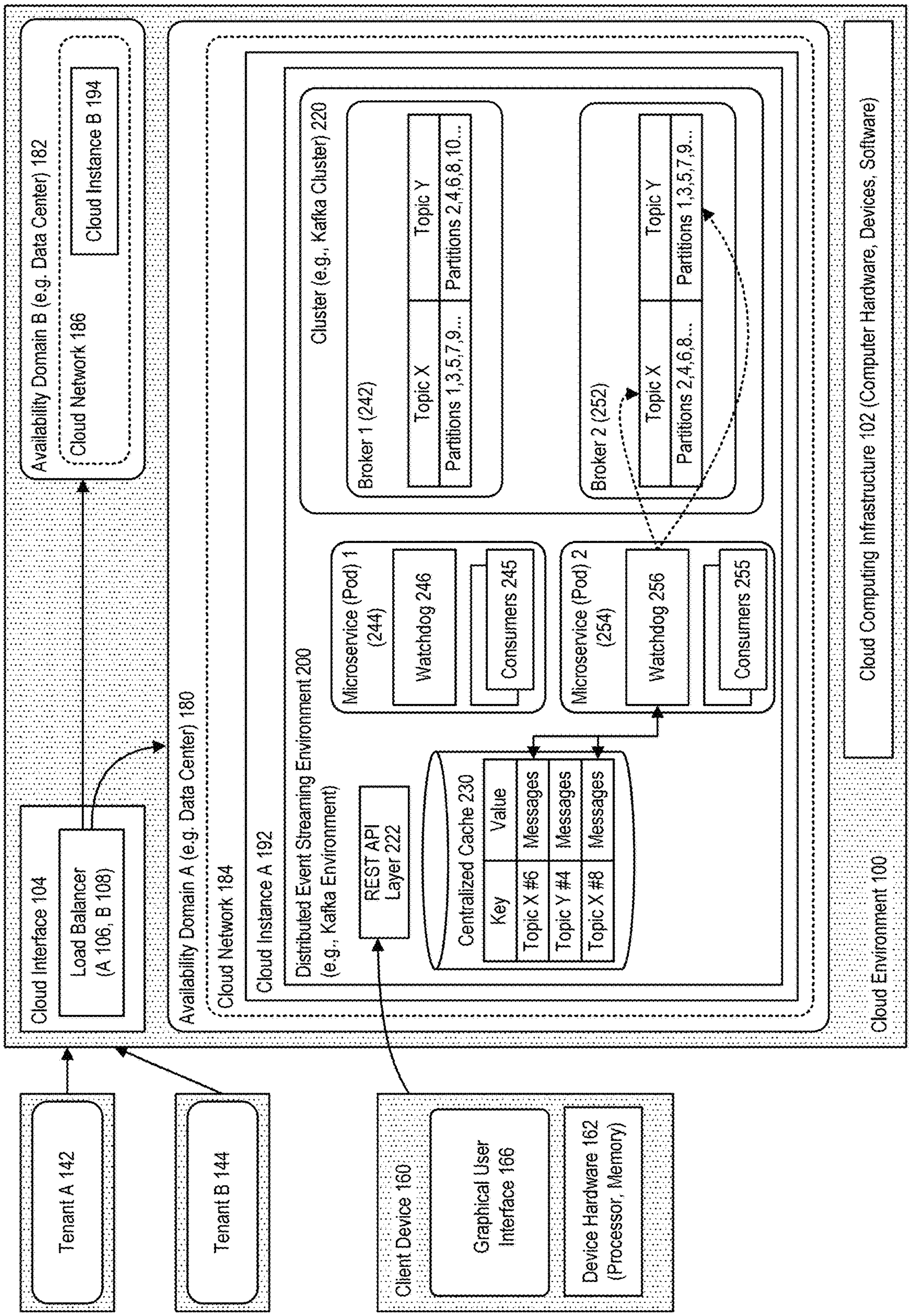
FIG. 11 further illustrates how the system can be used to make services resilient of producer failures, in accordance with an embodiment.

As illustrated in FIGS. 10-11, in accordance with an embodiment, Each watchdog can be configured to operate on a periodic basis, for example at 5-minute intervals or windows, to determine which messages that particular watchdog should attempt to resend to the producer. The watchdog process looks in the centralized cache for messages stored thereon that are destined for its partitions.

As described above, since a distributed streaming environment may support a large number of microservice, partition, and topics, segregating the data in this manner can be used to reduce contention in that each watchdog only needs to access data within the centralized cache appropriate to the particular partitions associated with that watchdog.

In accordance with an embodiment, the system can implement a watchdog that runs recurrently (for example, every 5 minutes) and queries the centralized cache for the messages to be re-sent to Kafka. As the watchdog thread will be running one per pod and there could be 'n' number of pods for a microservice, the watchdog will be made cognizant of the Kafka partitions that are assigned to them during rebalancing. Hence, the watchdogs can operate by look for specific cache entries with a key having format <TopicName #partitionId> where the partitionId will be the list of partitions assigned and managed by the pods.

Example Method

Figure 12:
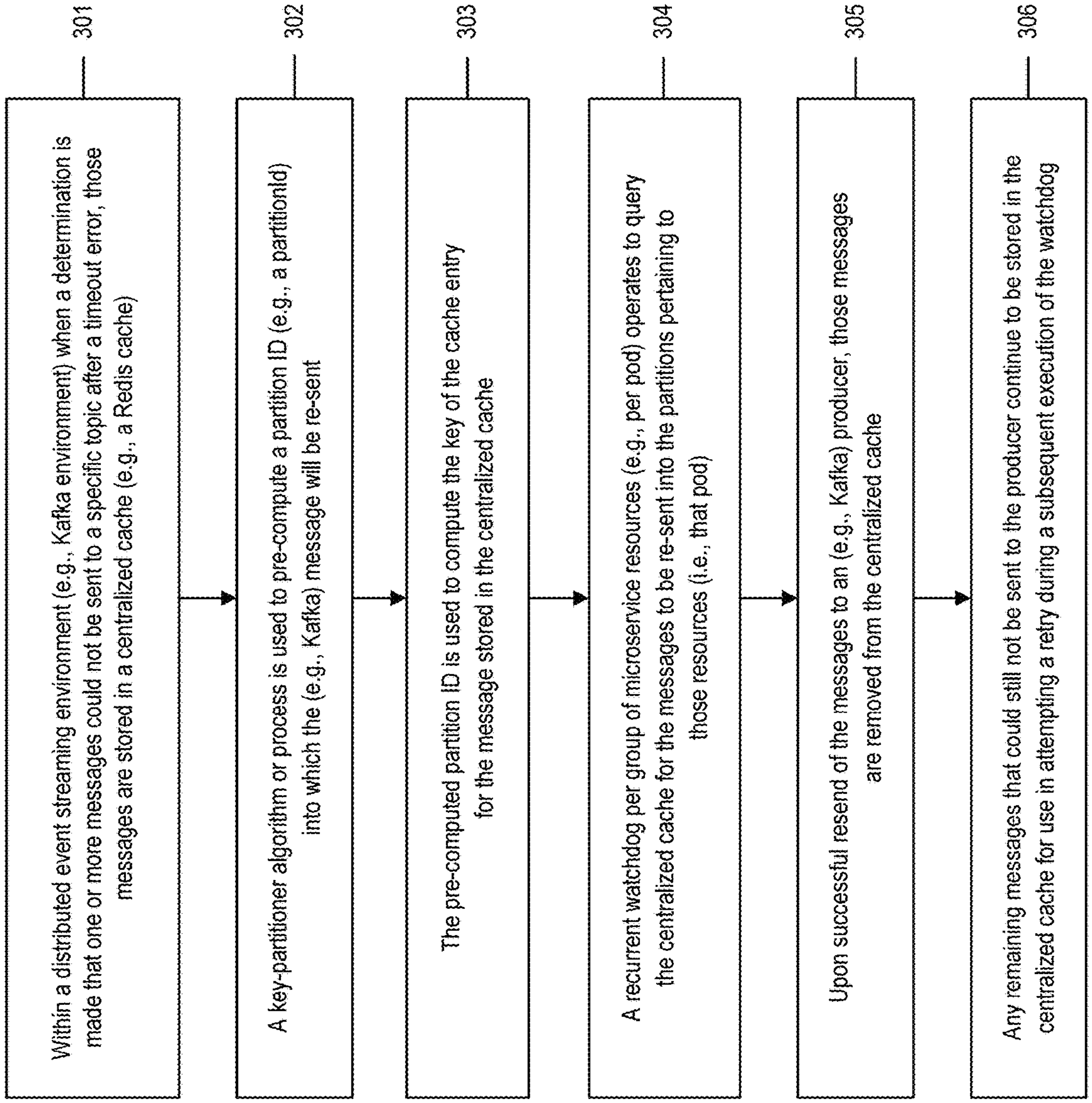
FIG. 12 illustrates a method for use with a distributed event streaming environment for making services resilient of producer failures, in accordance with an embodiment.

FIG. 12 illustrates a method for use with a distributed event streaming environment for making services resilient of producer failures, in accordance with an embodiment.

As illustrated in FIG. 12, in accordance with an embodiment, at step 301, when a determination is made that one or more messages could not be sent to a particular topic after a timeout error, those messages are stored in a centralized cache (e.g., as provided by a database service, for example a Redis cache).

At step 302, a key-partitioner algorithm or process is used to pre-compute a partition ID (e.g., a partitionId) into which the (e.g., Kafka) message will be re-sent.

At step 303, the pre-computed partition ID is used to compute the key of the cache entry for the message as stored within the centralized cache.

At step 304, a recurrent watchdog per group of microservice resources (e.g., per pod) operates to query the centralized cache for the messages to be re-sent into the partitions pertaining to those resources (i.e., that pod).

At step 305, upon a successful resend of the messages to an (e.g., Kafka) producer, those messages are removed from the centralized cache.

At step 306, any remaining messages that could still not be sent to the producer continue to be stored in the centralized cache for use in attempting to retry the operation during a subsequent execution of the watchdog.

In accordance with various embodiments, the systems and methods described herein can be implemented using one or more computer, computing device, machine, or microprocessor, including one or more processors, memory and/or computer readable storage media programmed according to the teachings of the pre-sent disclosure. Appropriate software coding can readily be prepared by skilled programmers based on the teachings of the pre-sent disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the pre-sent teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with a Kafka environment; in accordance with various embodiments, the systems and methods described herein can be used with other types of distributed event streaming environments enterprise software applications, cloud environments, cloud services, cloud computing, or other computing environments.

The embodiments were chosen and described in order to best explain the principles of the pre-sent teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a distributed event streaming environment, for making services resilient of producer failures, comprising:

a computer, comprising one or more processors and a distributed event streaming environment provided therein, wherein the distributed event streaming environment includes a cluster of nodes and one or more partitions distributed across the nodes, and a producer that operates to receive an input data as messages and communicate with one or more brokers to write the data into partitioned topics;

wherein when a determination is made that one or more messages could not be sent to a particular topic after a timeout error the system operates so that:

the messages that could not be sent are stored in a centralized cache;

a key-partitioner process is used to pre-compute a partition ID into which the message will be re-sent;

the pre-computed partition ID is used to compute the key of the cache entry for the message as stored within the centralized cache; and a recurrent watchdog associated with a group of microservice resources operates to query the centralized cache for the messages to be re-sent into the partitions pertaining to the microservice resources, wherein the watchdog is configured to operate on a periodic basis to determine which messages the watchdog should attempt to resend to the producer, wherein the watchdog process looks in the centralized cache for messages stored thereon that are destined for its partitions;

wherein upon a successful resend of the messages to a producer, those messages are removed from the centralized cache, and remaining messages are stored in the centralized cache for use during a subsequent execution of the watchdog.

2. The system of claim 1, wherein a producer operates to receive an input data as messages and communicate with one or more brokers to write the data into partitioned topics, from which other entities can then consume the data.

3. The system of claim 1, wherein a recurrent watchdog is provided per group of microservice resources operating as a pod, and operates to query the centralized cache for the messages to be re-sent into the partitions pertaining to that pod.

4. The system of claim 1, wherein upon a successful resend of the messages to a producer, those messages are removed from the centralized cache, and any remaining messages that could still not be sent to the producer are stored in the centralized cache for use in attempting to retry the operation during a subsequent execution of the watchdog.

5. The system of claim 1, wherein the key-partitioner process uses a partitioner process provided by the distributed event streaming environment and its partition-topic assignment process, to use those assignments to determine in the centralized cache which particular keys to use, for use in later determine which messages to retry.

6. A method for use with a distributed event streaming environment, for making services resilient of producer failures, comprising:

providing at a computer comprising one or more processors a distributed event streaming environment, wherein the distributed event streaming environment includes a cluster of nodes and one or more partitions distributed across the nodes, and a producer that operates to receive an input data as messages and communicate with one or more brokers to write the data into partitioned topics;

wherein when a determination is made that one or more messages could not be sent to a particular topic after a timeout error the system operates so that:

the messages that could not be sent are stored in a centralized cache;

a key-partitioner process is used to pre-compute a partition ID into which the message will be re-sent;

the pre-computed partition ID is used to compute the key of the cache entry for the message as stored within the centralized cache; and a recurrent watchdog associated with a group of microservice resources operates to query the centralized cache for the messages to be re-sent into the partitions pertaining to the microservice resources, wherein the watchdog is configured to operate on a periodic basis to determine which messages the watchdog should attempt to resend to the producer, wherein the watchdog process looks in the centralized cache for messages stored thereon that are destined for its partitions;

wherein upon a successful resend of the messages to a producer, those messages are removed from the centralized cache, and remaining messages are stored in the centralized cache for use during a subsequent execution of the watchdog.

7. The method of claim 6, wherein a producer operates to receive an input data as messages and communicate with one or more brokers to write the data into partitioned topics, from which other entities can then consume the data.

8. The method of claim 6, wherein a recurrent watchdog is provided per group of microservice resources operating as a pod, and operates to query the centralized cache for the messages to be re-sent into the partitions pertaining to that pod.

9. The method of claim 6, wherein upon a successful resend of the messages to a producer, those messages are removed from the centralized cache, and any remaining messages that could still not be sent to the producer are stored in the centralized cache for use in attempting to retry the operation during a subsequent execution of the watchdog.

10. The method of claim 6, wherein the key-partitioner process uses a partitioner process provided by the distributed event streaming environment and its partition-topic assignment process, to use those assignments to determine in the centralized cache which particular keys to use, for use in later determine which messages to retry.

11. A non-transitory computer readable storage medium, including instructions stored thereon which when read and executed by one or more computers cause the one or more computers to perform a method comprising:

providing a distributed event streaming environment, wherein the distributed event streaming environment includes a cluster of nodes and one or more partitions distributed across the nodes, and a producer that operates to receive an input data as messages and communicate with one or more brokers to write the data into partitioned topics;

wherein when a determination is made that one or more messages could not be sent to a particular topic after a timeout error the system operates so that:

the messages that could not be sent are stored in a centralized cache;

a key-partitioner process is used to pre-compute a partition ID into which the message will be re-sent;

the pre-computed partition ID is used to compute the key of the cache entry for the message as stored within the centralized cache; and a recurrent watchdog associated with a group of microservice resources operates to query the centralized cache for the messages to be re-sent into the partitions pertaining to the microservice resources, wherein the watchdog is configured to operate on a periodic basis to determine which messages the watchdog should attempt to resend to the producer, wherein the watchdog process looks in the centralized cache for messages stored thereon that are destined for its partitions;

wherein upon a successful resend of the messages to a producer, those messages are removed from the centralized cache, and remaining messages are stored in the centralized cache for use during a subsequent execution of the watchdog.

12. The non-transitory computer readable storage medium of claim 11, wherein a producer operates to receive an input data as messages and communicate with one or more brokers to write the data into partitioned topics, from which other entities can then consume the data.

13. The non-transitory computer readable storage medium of claim 11, wherein a recurrent watchdog is provided per group of microservice resources operating as a pod, and operates to query the centralized cache for the messages to be re-sent into the partitions pertaining to that pod.

14. The non-transitory computer readable storage medium of claim 11, wherein upon a successful resend of the messages to a producer, those messages are removed from the centralized cache, and any remaining messages that could still not be sent to the producer are stored in the centralized cache for use in attempting to retry the operation during a subsequent execution of the watchdog.

15. The non-transitory computer readable storage medium of claim 11, wherein the key-partitioner process uses a partitioner process provided by the distributed event streaming environment and its partition-topic assignment process, to use those assignments to determine in the centralized cache which particular keys to use, for use in later determine which messages to retry.

16. The system of claim 1, wherein the distributed event streaming environment includes a cluster and one or more brokers and partitions accessed by a plurality of microservices, each of which includes a watchdog associated therewith;

wherein each watchdog is configured to operate on a periodic basis to determine which messages that particular watchdog should attempt to resend to the producer, including looking in the centralized cache for messages stored thereon that are destined for its partitions and that are associated with that watchdog.

17. The system of claim 1, wherein the distributed event streaming environment is provided within a cloud computing environment that operates on a cloud computing infrastructure comprising one or more cloud interfaces or other application program interfaces that provide access to shared cloud resources.

18. The method of claim 6, wherein the distributed event streaming environment includes a cluster and one or more brokers and partitions accessed by a plurality of microservices, each of which includes a watchdog associated therewith;

wherein each watchdog is configured to operate on a periodic basis to determine which messages that particular watchdog should attempt to resend to the producer, including looking in the centralized cache for messages stored thereon that are destined for its partitions and that are associated with that watchdog.

19. The method of claim 6, wherein the distributed event streaming environment is provided within a cloud computing environment that operates on a cloud computing infrastructure comprising one or more cloud interfaces or other application program interfaces that provide access to shared cloud resources.

20. The non-transitory computer readable storage medium of claim 11, wherein the distributed event streaming environment includes a cluster and one or more brokers and partitions accessed by a plurality of microservices, each of which includes a watchdog associated therewith;

wherein each watchdog is configured to operate on a periodic basis to determine which messages that particular watchdog should attempt to resend to the producer, including looking in the centralized cache for messages stored thereon that are destined for its partitions and that are associated with that watchdog.

* * * * *